United States Patent [19]

Todorovic

[11] Patent Number: 5,322,533
[45] Date of Patent: Jun. 21, 1994

[54] DECONTAMINATION SYSTEM FOR REMOVAL OF HAZARDOUS SUBSTANCES

[75] Inventor: Mile Todorovic, Ringwood, N.J.

[73] Assignee: Arco Restoration, Inc., Ringwood, N.J.

[21] Appl. No.: 910,447

[22] Filed: Jul. 8, 1992

[51] Int. Cl.⁵ .............................................. B01D 46/10
[52] U.S. Cl. ................................ 55/385.2; 55/472; 55/500; 454/58
[58] Field of Search ............... 55/210, 213, 385.1, 55/385.2, 472, 500; 454/58

[56] References Cited

U.S. PATENT DOCUMENTS

| | | | |
|---|---|---|---|
| 4,902,315 | 2/1990 | Spicer | 55/385.2 X |
| 5,053,065 | 10/1991 | Garay et al. | 55/385.2 X |
| 5,074,897 | 12/1991 | Sikich | 55/385.2 |
| 5,099,751 | 3/1992 | Newman et al. | 55/385.2 X |

*Primary Examiner*—Charles Hart

[57] ABSTRACT

A fail-safe air handling and safety system is described. The system is for use by workers during removal of hazardous substances, such as asbestos, lead, and toxic chemicals, from within a structure. The structure has a containment area with air exhaust openings for maintaining the containment area at negative pressure with respect to ambient. A decontamination unit sealingly connects to a doorway in the containment area and provides for an air locked entryway for the workers. For convenience of on-site erection, the decontamination unit is modular with the modules sealingly connected in a series with each module connected the one to the other. Unique air inlet diffusers provide inflowing makeup air, and the devices are interlocked so that, upon loss of negative pressure in the containment area, a standby air filter becomes operational. Upon the occurrence of an emergency—a fire, explosion or power failure, in which a loss of pressure differential is experienced, the air inlets and outlets close and standby units are operated from alternate power sources.

20 Claims, 3 Drawing Sheets

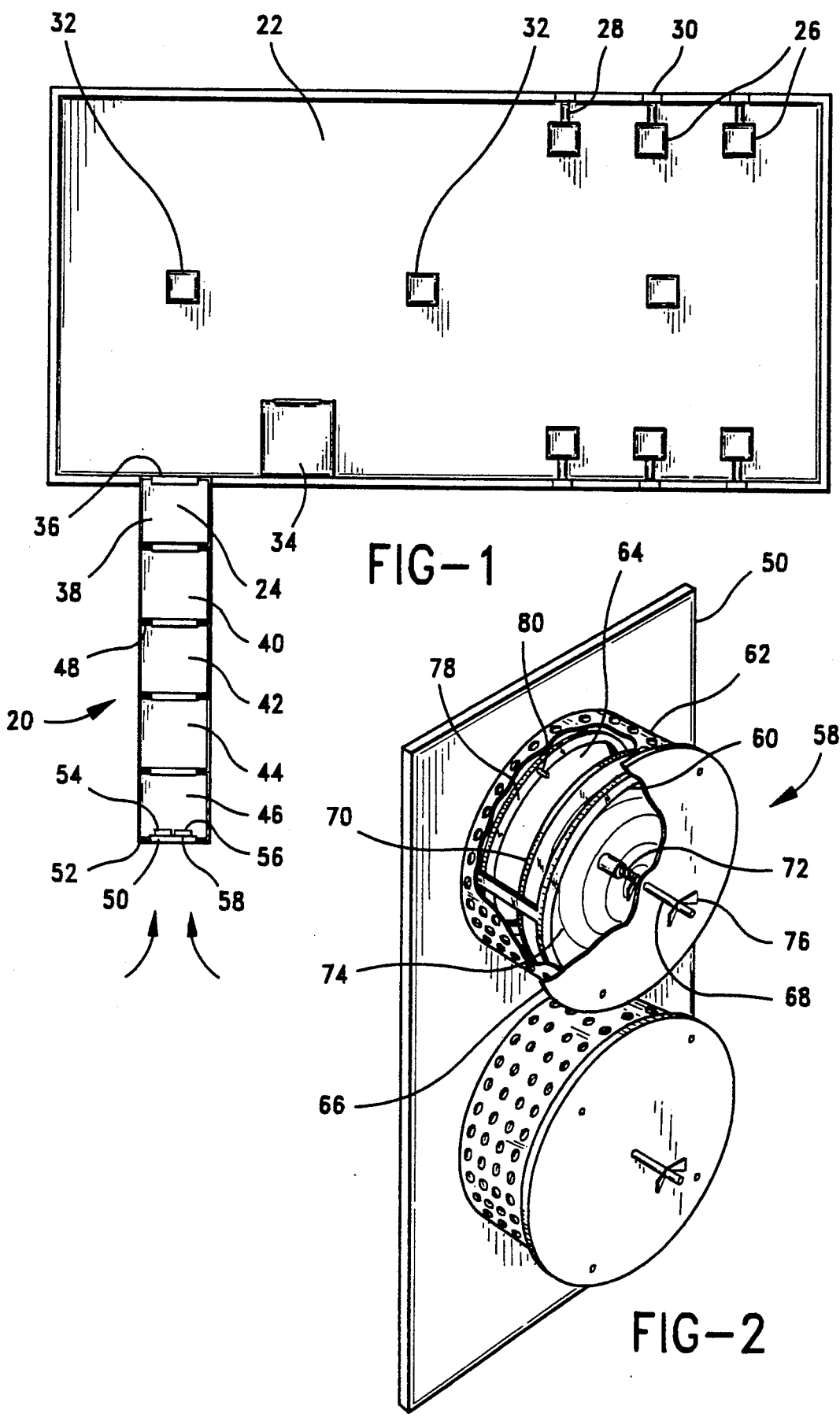

DECONTAMINATION SYSTEM FOR REMOVAL OF HAZARDOUS SUBSTANCES

BACKGROUND OF THE INVENTION

1. Field of the Invention

This invention relates to a decontamination system for removal of hazardous substances such as asbestos, lead, and toxic chemicals. Moreover the system particularly relates to a decontamination unit with diffused airflow in the entry chambers formed thereby and circulating through the containment area. The system has high versatility and is applicable to almost any environment or architecture, including occupied buildings, densely populated areas, and worksites in crawl spaces and small passageways.

2. Information Disclosure Statement

Several patents descriptive of decontamination systems are known to the inventor hereof. The patents are as follows:

| Patent    | Inventor     | Issue Date |
|-----------|--------------|------------|
| 4,604,111 | Natale       | 8/1986     |
| 4,801,312 | Mateson      | 1/1989     |
| 4,905,578 | Curtis et al.| 3/1990     |
| 4,922,806 | Newman et al.| 5/1990     |
| 4,963,170 | Weber et al. | 10/1990    |
| 4,993,313 | Newman et al.| 2/1991     |
| 5,009,685 | Wilson et al.| 4/1991     |

The U.S. Pat. No. 4,604,111 to Natale shows a system and a method of use thereof for enclosing a source of hazardous particulate matter along with a decontamination chamber space. Air flow is provided through the enclosure and through the decontamination chamber. This air is then filtered and exhausted. However, the air inlet and outlet of the decontamination chamber are positioned such that an uneven or non-uniform pattern of air flow through the decontamination chamber and through the decontaminated areas may result before the air is exhausted.

The U.S. Pat. No. 4,801,312 to Mateson teaches a decontamination space having a plurality of rooms and air locks between the rooms and a work space wall with laminar air flow at the wall.

The U.S. Pat. No. 4,905,578 to Curtis et al. teaches an air handling device for contaminated areas in which air is removed therefrom and returned with make-up air after filtration.

The U.S. Pat. No. 4,922,806 to Newman and Natale teaches a construct using the structure similar to patent of Natale '111, but having a flap for sealing upon loss of negative air pressure in the work area.

The U.S. Pat. No. 4,963,170 to Weber et al. teaches the using of HEPA filters to purify inflowing and outflowing air from the work area.

The U.S. Pat. No. 4,993,313 to Newman and Natale teaches, upon power failure, the maintenance of negative pressure within an enclosed area and facilitates the quick exit of workmen therefrom.

The U.S. Pat. No. 5,009,685 to Wilson et al. teaches the use of a decontamination unit mounted between a work area and a dressing room with negative air pressure in the work area and positive air pressure in the decontamination unit both maintained by filtered air pumps.

With all the prior advances in the art several technological problems remain. Typical thereof is that of the even diffusion of air throughout all parts of the containment area. Several of the above-cited systems, including the system of Natale, permit particulate-laden air to accumulate in the corners and to form a health hazard. Other system defects include the lack of control of the volume of makeup air and accuracy in maintaining the differential pressure between the negative pressure of the containment area and the external ambient pressure.

Of special note is the emergency mode of operations. Here the technological problems that arise during power failure and upon the occurrence of a fire are addressed. Workmen in the containment area need safe haven, and the public needs protection from the contaminated air in the containment area. These are the technological shortfalls of the above systems and are addressed hereinbelow.

In addition to the above background certain aspects of hazardous substance removal are highly regulated by both Federal and State agencies, notably the Environmental Protection Agency, the Occupational Safety and Health Administration, and various State Departments of Environmental Protection. All equipment described herein meets or exceeds the guidelines of the various agencies.

SUMMARY

In general terms, the invention disclosed hereby includes a fail-safe air handling and safety system for use by workers during removal of hazardous substances, such as asbestos, lead, and toxic chemicals, from within a structure. The structure has a containment area with air exhaust openings for maintaining the containment area at negative pressure with respect to ambient. A decontamination unit sealingly connects to a doorway in the containment area and provides for an air locked entryway for the workers. For convenience of on-site erection, the decontamination unit is modular with the modules sealingly connected in a series with each module connected the one to the other. Unique air inlet diffusers provide inflowing makeup air, and the devices are interlocked so that, upon loss of negative pressure in the containment area, a standby air filter becomes operational. Upon the occurrence of an emergency—a fire, explosion or power failure, in which a loss of pressure differential is experienced, the air inlets and outlets close and standby units are operated from alternate power sources. Other systems aspects are described below.

OBJECT AND FEATURES OF THE INVENTION

It is an object of the present invention to provide a fail/safe decontamination unit for use in the removal of hazardous substances such as asbestos, lead and toxic chemicals.

It is a further object of the present invention to provide diffused air inflow into the decontamination unit through an inlet which closes upon loss of differential pressure between the containment area and ambient which inlet has an adjustable spring bias for selecting the differential pressure desired.

It is yet another object of the present invention to provide a novel air valve for pressurized room air inlets and outlets, and to provide a constant flow of air under all operating conditions.

It is still yet another object of the present invention to provide a safety module within the containment area with communications, first aid, and firefighting equipment.

It is a feature of the present invention that there is a standby air treatment machine for removing particulates from recirculating air during a power failure which machine is also usable for treating air otherwise not exhaustable from the containment area.

It is another feature of the present invention that the decontamination unit hereof can be utilized efficiently with the heating, ventilating and air conditioning system (HVAC) to provide room temperature air for decontamination workers.

Other objects and features of the invention will become apparent upon review of the drawings and the detailed description which follow.

BRIEF DESCRIPTION OF THE DRAWINGS

In the following drawings, the same parts in the various views are afforded the same reference designators.

FIG. 1 is a block diagram of the decontamination system of the present invention;

FIG. 2 is a perspective view of an air inlet port of the present invention with the cover partially broken away to illustrate further details thereof;

DESCRIPTION OF THE PREFERRED EMBODIMENT

Figure 3:
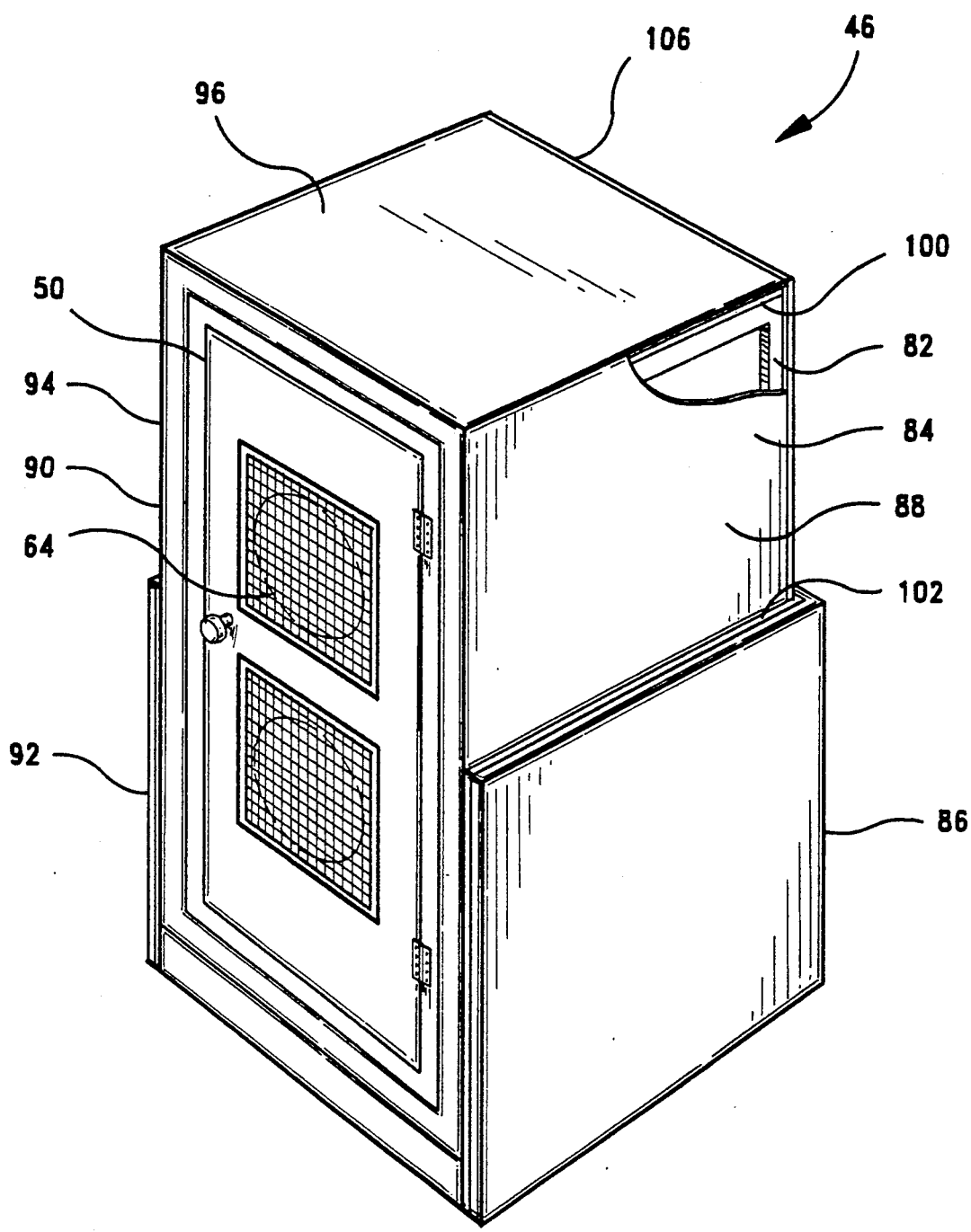
FIG. 3 is a perspective view of a module of the invention shown in the extended form.

In the disclosure at hand, a decontamination system is provided for application to hazardous material removal sites. Although the current specific tasks are usually asbestos removal, the technology herein described is applicable to lead removal, sites with hazardous airborne particulates other than asbestos fibers, and toxic chemical wastes. The unit for convenience has modular stainless steel units which each have a 4 by 4 foot footprint and, when fully extended have a seven foot height. The modules telescope down to a four foot height during movement to the site and for storage purposes. The passageway formed by the decontamination unit have doors at both ends with air diffusing units. The air diffusing units are operated by the air pressure differential permitting air to enter as long as the air pressure in the removal site is negative with respect to the exterior. The system has high versatility and is applicable to almost any environment or architecture, including occupied buildings, densely populated areas, and worksites in crawl spaces and small passageways. A fuller detailed operational description of the air flow through the decontamination unit and the removal site is provided following the structural description of the system components.

Referring now to FIG. 1, a system block diagram is provided. The decontamination system, referred to generally by the numeral 20, has two major structural areas, namely, the removal site 22 or containment area and the decontamination unit 24.

At various locations throughout the containment area 22, air treatment machines or high efficiency particulate removal units (HEPA) 26 are installed with the processed air flowing therefrom ducted or piped to exhaust vents 28 with adjustable outlet port 30 attached to the vents 28. Although for purposes of the best mode of practicing this invention, the HEPA units are used, other air treatment machines may be suitably employed. Presently, for example, organic filtration systems are used for eliminating chemical fumes and numerous hybrid filters are available with special absorption and adsorption stages for prescribed conditions. In the best mode of operations, the HEPA filters are used to provide at least two stages of filtration for removal of airborne particulates, and, in the case of asbestos fiber removal, the HEPA filters remove airborne asbestos fibers in the submicron range. Also, as will be described in greater detail hereinbelow, one or more HEPA units 32 are positioned within the containment area 22 and recirculate air within the system during another mode operations. The containment area 22 also has a safety cube or respirator module 34 described below. The door 36 leading from the containment area 22 to the decontamination unit 24 is sealed to the first module 38 which, in turn, is sealed to successive module 40. In the embodiment shown, five modules 38, 40, 42, 44 and 46 are sealed one to another. The module seals 48 prevent uncontrolled air from entering into and contaminated air from exiting from the system 20. A decontamination unit door 50 is sealed to module 46 using a door seal 52. The door 50 provides makeup air to the system 20 through intake vents 54 and 56 with adjustable inlet port 58. In use, the decontamination unit 24 has dividing members or shower curtains (not shown) between adjacent functional areas.

Referring now to FIG. 2, the adjustable air inlet port 58 and decontamination unit door 50 are shown in greater detail. While the inlet ports 58 may be attached to any location communicating with non-contaminated air, the door mounting configuration is presently preferred. The inlet ports 58 are constructed with a frame 60 which supports an air-diffusing perforated plate 62. An airflow aperture or port 64 is located in the door, wall, or roof, to which the air inlet port 58 is attached. The port 58 is mounted on the downstream side of door 50 and is covered with cover plate 66 which, optionally, may also be of a perforated design. The plate 66 supports a stem or shaft 68 to which a port closure plate 70 is attached. Plate 70 is normally held by a primary spring 72 and an adjustable secondary spring 74 in a closed position. During operations, when the pressure downstream is negative with respect to ambient pressure, the closure plate is structured to overcome the pressure gradient and to provide makeup air. An adjustment screw and nut arrangement 76 increase or decreases the spring tension so that a variety of air inflow specifications can be met. The port 64 and plate 70 are gasketed with gasket 78 and are interlocked with HEPA units 32. This construction provides that, upon rising air pressure, as the containment pressure approaches zero, the plate 66 closes aperture 64 and the interlock mechanism—switch or remote—80 starts the standby recirculation unit 32 when the makeup air port 64 is closed. Also, the interlock mechanism 80 can be utilized to switch HEPA units 26 to an alternate power source. If the system application requires additional makeup air inlets, air inlet controls can optionally be added to the containment area.

Referring now to FIG. 3, a typical module 46 is next described. The module 46 is the last in the series, and as such, has a door unit 50 as just described above. The module 46 is constructed as a four-foot cube which expands to a 4×4×7 foot structure. The walls are 4×4 panels of stainless steel that are moved up and down and readily telescope to form the erect structure and the transportable cube. The module 46 has a frame 82 and two sidewalls 84 and 90 each with lower panels 86 and 92 and upper panels 88 and 94, respectively. The module 46 is constructed with a ceiling panel 96 and a floor pan 98, typically 4 inches deep, attached and sealed to frame 82 (optional). Within the module 46, seals 100, 102 and 104 provide sealing between the panel 96 and the frame 82, between panels 86 and 88 and panels 92 and 94, and between the pan 98 and the frame 82. Additional sealing is provided between adjacent modules with gasket 106.

Figure 4:
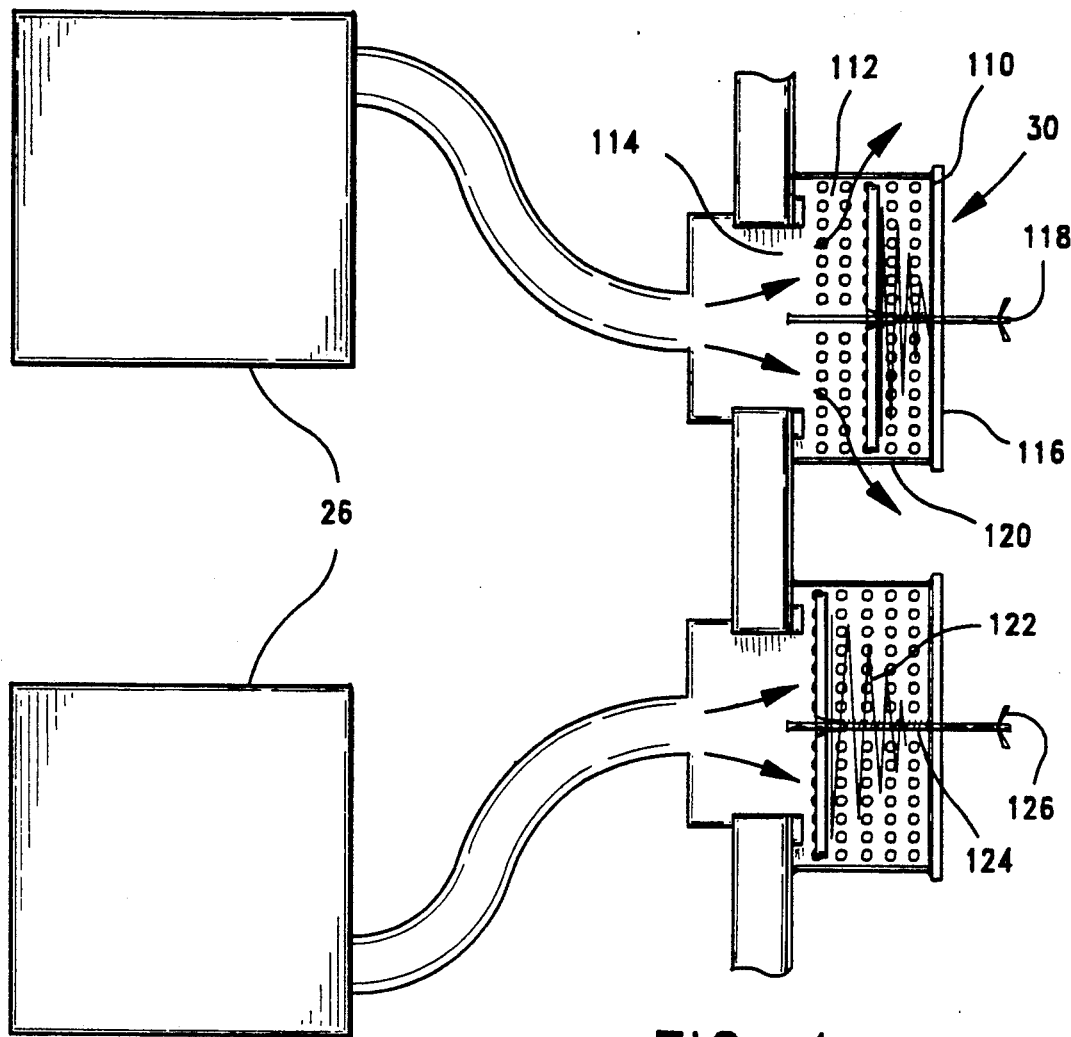
FIG. 4 is a detailed cross-sectional view of an air outlet port of the invention; and, FIG. 5 is a partial schematic diagram showing the emergency module.

In FIG. 4, a detailed cross-sectional view of an adjustable air outlet port 30 is shown and described. These units are ducted to each HEPA unit 26 and are mounted on the downstream side of the air outlet. The outlet ports 30 are constructed with a frame 110 which supports an air-diffusing perforated plate 112. An airflow aperture 114 is located in wall adjacent the HEPA device. The port 30 is covered with cover plate 116, which, optionally, may also be of a perforated design. The plate 116 supports a shaft 118 to which a port closure plate 120 is attached. Plate 120 is normally by a secondary spring 122 and an adjustable primary spring 124 in a closed position. During operations when air is outflowing from the HEPA unit causes pressure greater than ambient, the closure plate is structured to overcome the pressure gradient and to provide for air exhaustion. An adjustment screw and nut arrangement 126 increases or decreases the spring tension so that a variety of air outflow requirements can be met.

Figure 5:
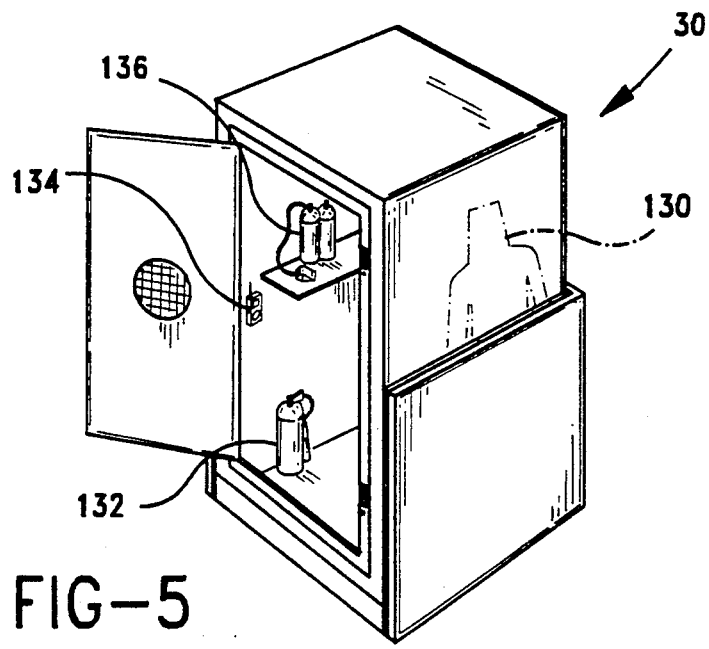

Turning now to FIG. 5, an emergency module 34 is shown. The structure thereof insofar as walls, ceiling, and floor pan are substantially the same as the decontamination unit module 46 described above. The emergency module or safety cube 34, which may be located at any convenient location in the containment area, includes a temporary refuge in case of fire and provides fire clothing and fire fighting equipment 130 and first aid facility 132. Communications are provided through a battery powered walkie talkie 134, and a self-contained breathing apparatus 136 is also provided.

In operation, a containment area or removal site 22 is first thoroughly sealed. A decontamination unit 24 is sealed to door 36 and the module 38 is sealed to module 40; module 40, to module 42; module 42 to module 44; module 44 to module 46; and module 46 to door 50. Each inlet port 58 is checked and the spring tension at spring 74 is adjusted as required for the application. The HEPA units 26 are checked and the spring tension at each spring 124 is adjusted as required for the application. The recirculating HEPA units 32 and the safety cube 34 are emplaced in the containment area. The interlock control 80 is operated triggering the operation of the recirculating HEPA units 32. In normal operations, the air outlet diffuser 30 is sealingly mounted to the exhaust port, and the air outlet diffuser is operable, when the exhaust air treatment device output is at or above a predetermined positive pressure, to an open position for the outflow of air. Conversely, when the exhaust air treatment device output is below the predetermined positive pressure, the diffuser 30 is operable to the closed position.

The next operational aspect discussed is the airflow patterns. After installation and during normal operations, contaminated air is purified by the HEPA units and purified air is exhausted lowering the air pressure in the containment area. As the pressure lowers, makeup air at a higher pressure overcomes the spring bias at spring 74 and enters through the decontamination unit to the containment area. Under abnormal conditions, as for example during a power failure, the HEPA units cease operating and the air pressure in the containment area comes to ambient and there is no differential pressure at the air diffuser to overcome the spring bias. The plate 66 closes over the inlet aperture seals against the gasket and sets off the interlock mechanism causing the standby air treatment machine to start. Simultaneously, as the plate 66 closes over the closure plate 120 closes over the outlet ports trapping any contaminated air within the containment area.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed is:

1. An air handling and safety system for use by workers during removal of hazardous contaminants from within a structure, said structure having a containment area therewithin with air exhaust openings for maintaining said containment area at negative pressure with respect to ambient and a containment area doorway for entry and egress of said workers, said system comprising:

a decontamination unit sealingly connected at one end to said doorway providing an air locked entryway for said workers, in turn comprising:
  a plurality of modules, each module sealingly connected in a series to form the decontamination unit, each said module connected the one to the other;
  a decontamination unit door sealingly connectged to the module at the end of the decontamination unit opposite the containment area doorway;
  one or more air inlet diffusers sealingly mounted to said decontamination unit, each said air inlet diffuser operable, when said containment area is at or below a predetermined negative pressure, to provide inflowing makeup air; and, operable when the air pressure is above said predetermined negative pressure, to a closed position;
  interlock device connected to said air inlet diffuser and operable upon loss of negative pressure in the containment area;
 one or more exhaust air treatment devices sealingly connected to said air exhaust port, each said exhaust air treatment device removing airborne hazardous contaminant material from the containment area air and maintaining negative pressure therewithin;
 one or more recirculating air treatment devices housed within the containment area, and operated by said interlock device, each said recirculating air treatment device removing airborne particulate material from the containment area air and reducing the level of hazardous contaminants therein;
whereby, upon loss of negative pressure in said containment area, and closure of said one or more air inlet diffusers, said interlock device operates said one or more recirculating air treatment devices ensuring continuing treatment of contaminated air with the containment area sealed.

2. An air handling and safety system as described in claim 1 wherein said exhaust air treatment devices include high efficiency particulate air (HEPA) filters and provide at least two stages of filtration for removal of airborne particulates.

3. An air handling and safety system as described in claim 2 wherein said HEPA filters remove airborne asbestos fibers in the submicron range.

4. An air handling and safety system as described in claim 1 wherein said exhaust air treatment devices are organic filtration systems for removal of airborne toxic chemical fumes.

5. An air handling and safety system as described in claim 1 wherein said air inlet diffuser further comprises an air inlet port in said decontamination unit and an inlet port closure plate sealingly mounted on said inlet port with a spring bias thereagainst, said inflowing makeup air overcoming the spring bias and flowing through the decontamination unit to the containment area.

6. An air handling and safety system as described in claim 5 wherein said air inlet diffuser further comprises an inlet adjustment means for adjusting said spring bias to control the negative pressure maintained in the containment area.

7. An air handling and safety system as described in claim 1 wherein each said one or more exhaust air treatment devices further comprises:

an air outlet diffuser sealingly mounted to said exhaust port, each said air outlet diffuser operable, when said exhaust air treatment device output is at or above a predetermined positive pressure, to an open position for the outflow of air, and operable, when said exhaust air treatment device output is below said predetermined positive pressure, to a closed position.

8. An air handling and safety system as described in claim 7 wherein each said air outlet diffuser further comprises an exhaust port closure plate sealingly mounted on said exhaust port with a spring bias thereagainst, said outflowing exhaust air overcoming the spring bias.

9. An air handling and safety system as described in claim 8 wherein each said air outlet diffuser further comprises an outlet adjustment means for adjusting said spring bias to control the negative pressure in said containment area.

10. An air handling and safety system for use by workers during removal of hazardous contaminants from within a structure, said structure having a containment area therewithin with air exhaust openings for maintaining said containment area at negative pressure with respect to ambient and a containment area doorway for entry and egress of said workers, said system comprising:

a decontamination unit sealingly connected at one end to said doorway providing an air locked entryway for said workers, in turn comprising:

a plurality of modules, each module sealingly connected in a series to form the decontamination unit, each said module connected the one to the other;

a decontamination unit door sealingly connected to the module at the end of the decontamination unit opposite the containment area doorway;

one or more air inlet diffusers sealingly mounted to said decontamination unit, each said air inlet diffuser operable, when said containment area is at or below a predetermined negative pressure, to provide inflowing makeup air; and, operable when the air pressure is above said predetermined negative pressure, to a closed position;

interlock device connected to said air inlet diffuser and operable upon loss of negative pressure in the containment area;

one or more exhaust air treatment devices sealingly connected to said air exhaust port, each said exhaust air treatment device removing airborne hazardous contaminant material from the containment area air and maintaining negative pressure therewithin;

an air outlet diffuser sealingly mounted to said exhaust port, each said air outlet diffuser operable, when said exhaust air treatment device output is at or above a predetermined positive pressure, to an open position for the outflow of air, and operable, when said exhaust air treatment device output is below said predetermined positive pressure, to a closed position;

an exhaust port closure plate sealingly mounted on said exhaust port with a spring bias thereagainst, said outflowing exhaust air overcoming the spring bias;

one or more recirculating air treatment devices housed within the containment area, and operated by said interlock device, each said recirculating air treatment device removing airborne particulate material from the containment area air and reducing the level of hazardous contaminants therein;

whereby, upon loss of negative pressure in said containment area, and closure of said one or more air inlet diffusers, said interlock device operates said one or more recirculating air treatment devices ensuring continuing treatment of contaminated air with the containment area sealed.

11. An air handling and safety system as described in claim 10 wherein said exhaust air treatment devices include high efficiency particulate air (HEPA) filters and provide at least two stages of filtration for removal of airborne particulates.

12. An air handling and safety system as described in claim 11 wherein said HEPA filters remove airborne asbestos fibers in the submicron range.

13. An air handling and safety system as described in claim 10 wherein said exhaust air treatment devices are organic filtration systems for removal of airborne toxic chemical fumes.

14. An air handling and safety system as described in claim 10 wherein said air inlet diffuser further comprises an air inlet port in said decontamination unit and an inlet port closure plate sealingly mounted on said inlet port with a spring bias thereagainst, said inflowing makeup air overcoming the spring bias and flowing through the decontamination unit to the containment area.

15. An air handling and safety system as described in claim 14 wherein said air inlet diffuser further comprises an inlet adjustment means for adjusting said spring bias to control the negative pressure maintained in the containment area and each said air outlet diffuser further comprises an outlet adjustment means for adjusting said spring bias to control the negative pressure in said containment area.

16. An air handling and safety system for use by workers during removal of hazardous contaminants from within a structure, said structure having a containment area therewithin with air exhaust openings for maintaining said containment area at negative pressure with respect to ambient and a containment area doorway for entry and egress of said workers, said system comprising:
- a decontamination unit sealingly connected at one end to said doorway providing an air locked entryway for said workers, in turn comprising:
  - a plurality of modules, each module sealingly connected in a series to form the decontamination unit, each said module connected the one to the other;
  - a decontamination unit door sealingly connected to the module at the end of the decontamination unit opposite the containment area doorway;
  - one or more air inlet diffusers sealingly mounted to said decontamination unit, each said air inlet diffuser operable, when said containment area is at or below a predetermined negative pressure, to provide inflowing makeup air; and, operable when the air pressure is above said predetermined negative pressure, to a closed position;
  - interlock device connected to said air inlet diffuser and operable upon loss of negative pressure in the containment area;
  - one or more exhaust air treatment devices sealingly connected to said air exhaust port, each said exhaust air treatment device removing airborne hazardous contaminant material from the containment area air and maintaining negative pressure therewithin;
- an air inlet port in said decontamination unit and an inlet port closure plate sealingly mounted on said inlet port with a spring bias thereagainst, said inflowing makeup air overcoming the spring bias and flowing through the decontamination unit to the containment area;
- an air outlet diffuser sealingly mounted to said exhaust port, each said air outlet diffuser operable, when said exhaust air treatment device output is at or above a predetermined positive pressure, to an open position for the outflow of air, and operable, when said exhaust air treatment device output is below said predetermined positive pressure, to a closed position;
- an exhaust port closure plate sealingly mounted on said exhaust port with a spring bias thereagainst, said outflowing exhaust air overcoming the spring bias;
- one or more recirculating air treatment devices housed within the containment area, and operated by said interlock device, each said recirculating air treatment device removing airborne particulate material from the containment area air and reducing the level of hazardous contaminants therein;

whereby, upon loss of negative pressure in said containment area, and closure of said one or more air inlet diffusers, said interlock device operates said one or more recirculating air treatment devices ensuring continuing treatment of contaminated air with the containment area sealed.

17. An air handling and safety system as described in claim 16 wherein said exhaust air treatment devices are high efficiency particulate air (HEPA) filters providing at least two stages of filtration and removing airborne particulates.

18. An air handling and safety system as described in claim 17 wherein said HEPA filters removal of airborne asbestos fibers in the submicron range.

19. An air handling and safety system as described in claim 16 wherein said exhaust air treatment devices are organic filtration systems for removal of airborne toxic chemical fumes.

20. An air handling and safety system as described in claim 16 wherein said air inlet diffuser further comprises an inlet adjustment means for adjusting said spring bias to control the negative pressure maintained in the containment area and an outlet adjustment means for adjusting said spring bias to control the negative pressure in said containment area.

* * * * *